Patented Aug. 12, 1947

2,425,440

UNITED STATES PATENT OFFICE 2,425,440

PROCESS FOR SEPARATING PYRROLE AND PYRIDINE BASES

George Riethof, Mount Lebanon, Pa., assignor to Pittsburgh Coke & Chemical Company, Pittsburgh, Pa., a corporation of Pennsylvania No Drawing. Application June 15, 1945, Serial No. 599,768

1 Claim. (Cl. 202—42)

This invention relates to the recovery of substantially pure pyrrole and its homologues from accompanying pyridine bases such as the picolines, lutidines and colidines.

Pyrroles from bones or tars are usually contaminated with homologues of pyridines which boil in the neighborhood of the pyrroles, and therefore, it is frequently difficult to recover the pure pyrroles from such mixtures.

Pyridine and pyridine homologues form maximum azeotropes with phenol which can be availed of for separation purposes as described in my allowed application Serial No. 535,397, filed May 12, 1944, now United States Patent No. 2,383,016.

I have discovered, contrary to expectations, that pyrrole and its homologues do not form any azeotrope, either minimum or maximum with phenol, and that it is possible to separate pyrrole by a simple procedure from accompanying pyridine homologues.

The impure pyrrole-pyridine mixture is mixed with enough phenol to form a maximum azeotropic mixture with all the pyridine and pyridine homologues present and then the mass is fractionally distilled to recover the pyrrole.

Example

A mixture of pyrrole (B. P. 131° C.) and alpha picoline (B. P. 129° C.) as recovered from bone oil or tar is mixed with at least enough phenol to be effective to form an azeotrope with all alpha picoline present. This maximum azeotrope between alpha picoline and phenol boils at about 183.3° C. and therefore, about 52° higher than the pyrrole. By using only a very simple fractionation column, separation can be readily conducted and the first cut (after a very small fore-run of aqueous mixture) consists of pure, completely dry pyrrole.

After the pyrrole is distilled off, there is a small intermediate fraction of pyrrole and phenol and phenol azeotrope, and then the maximum azeotrope of phenol and picoline boils at the constant temperature of about 183.3° C. This azeotrope can be worked up by mixing it with an excess of sodium hydroxide solution, distilling off the alpha picoline and recovering the phenol from the sodium phenolate liquor. This recovered phenol and the small intermediate fraction above mentioned is used for the next run.

While I have described a mixture of pyrrole and alpha picoline in the example, the invention is equally operative with other homologues of pyridine, and homologues of pyrrole, for instance alpha, or beta methyl pyrrole which boil in the range of gamma and beta picoline. In fact the invention is operative in all cases where the pyrrole is contaminated with pyridine bases and the claims are intended to cover such mixtures.

I claim:

The process of purifying pyrrole from pyridine bases, comprising adding phenol in amount at least effective to form a maximum azeotrope with all pyridine bases present, and fractionally distilling the mass.

GEORGE RIETHOF.

REFERENCES CITED

The following references are of record in the file of this patent:

UNITED STATES PATENTS

| Number | Name | Date |
|---|---|---|
| 2,383,016 | Riethof | Aug. 21, 1945 |
| 2,350,447 | Cole | June 6, 1944 |